United States Patent
Papanikolaou et al.

(10) Patent No.: US 11,005,573 B2
(45) Date of Patent: May 11, 2021

(54) OPTIC SIGNAL RECEIVER WITH DYNAMIC CONTROL

(71) Applicant: MACOM Technology Solutions Holdings, Inc., Lowell, MA (US)

(72) Inventors: Vasilis Papanikolaou, Toronto (CA); Jeffrey Allen, Lowell, MA (US)

(73) Assignee: MACOM Technology Solutions Holdings, Inc., Lowell, MA (US)

(*) Notice: Subject to any disclaimer, the term of this patent is extended or adjusted under 35 U.S.C. 154(b) by 0 days.

(21) Appl. No.: 16/688,998

(22) Filed: Nov. 19, 2019

(65) Prior Publication Data
US 2020/0162169 A1    May 21, 2020

Related U.S. Application Data

(60) Provisional application No. 62/770,048, filed on Nov. 20, 2018.

(51) Int. Cl.
*H04B 10/00* (2013.01)
*H04B 10/69* (2013.01)
*H04L 25/03* (2006.01)
*H04B 10/25* (2013.01)

(52) U.S. Cl.
CPC ........ *H04B 10/695* (2013.01); *H04B 10/25* (2013.01); *H04L 25/03885* (2013.01)

(58) Field of Classification Search
USPC ............................................. 398/202–214
See application file for complete search history.

(56) References Cited

U.S. PATENT DOCUMENTS

| | | | | |
|---|---|---|---|---|
| 4,236,256 A | * | 11/1980 | Brackett | H04B 10/695 341/57 |
| 4,297,527 A | * | 10/1981 | Pate | H03G 3/32 381/107 |
| 4,415,803 A | * | 11/1983 | Muoi | H03F 1/08 250/214 A |
| 4,545,076 A | * | 10/1985 | Biard | H04B 10/693 257/E27.047 |
| 4,574,249 A | * | 3/1986 | Williams | H03F 1/083 250/214 AG |
| 4,805,236 A | * | 2/1989 | Urala | H03F 3/082 398/202 |

(Continued)

*Primary Examiner* — Agustin Bello
(74) *Attorney, Agent, or Firm* — Weide & Miller, Ltd.

(57) ABSTRACT

A system and method for controlling optical receiver operation in response to a received optic signal power level that includes providing an optic signal receiver having operation determined by one or more system settings. During operation, the optic signal is received and converted to an electrical signal. The electrical signal is evaluated to determine a power level of the electrical signal. Responsive to the power level of the electrical signal exceeding a first predetermined threshold, adjusting a first system setting and responsive to the power level of the received electrical signal decreasing below a second predetermined threshold, adjusting the first system setting. Then, responsive to the power level of the received electrical signal exceeding a third predetermined threshold, adjusting a second system setting and responsive to the power level of the received electrical signal decreasing below a fourth predetermined threshold, adjusting the second system setting.

19 Claims, 7 Drawing Sheets

(56) References Cited

U.S. PATENT DOCUMENTS

| | | | | |
|---|---|---|---|---|
| 4,859,964 A * | 8/1989 | Jorgensen | A61B 5/4393 | 330/279 |
| 5,321,849 A * | 6/1994 | Lemson | H03G 3/3052 | 398/209 |
| 5,603,114 A * | 2/1997 | Tomita | H03G 3/3052 | 455/249.1 |
| 5,678,198 A * | 10/1997 | Lemson | H03G 3/3084 | 370/202 |
| 5,872,468 A * | 2/1999 | Dyke | H03K 5/082 | 327/333 |
| 5,889,605 A * | 3/1999 | Claverie | H03F 3/087 | 398/202 |
| 5,953,690 A * | 9/1999 | Lemon | H03G 3/3089 | 250/214 C |
| 6,081,362 A * | 6/2000 | Hatakeyama | H04B 10/6933 | 327/309 |
| 6,215,514 B1 * | 4/2001 | Harris | H04H 20/12 | 348/192 |
| 6,445,732 B1 * | 9/2002 | Beamish | H04B 17/318 | 375/224 |
| 6,657,488 B1 * | 12/2003 | King | H03F 3/087 | 327/307 |
| 6,915,076 B1 * | 7/2005 | Mittal | H04B 10/07955 | 375/317 |
| 7,127,391 B2 * | 10/2006 | Chang | H04L 25/062 | 704/230 |
| 7,536,114 B2 * | 5/2009 | Gieseler | H03F 3/45085 | 250/214 AG |
| 7,616,700 B2 * | 11/2009 | Kim | H04L 25/03312 | 375/233 |
| 7,738,602 B2 * | 6/2010 | Langenbach | H04L 25/03197 | 375/341 |
| 7,978,985 B2 * | 7/2011 | Zheng | H04B 10/697 | 398/208 |
| 8,005,372 B2 * | 8/2011 | Takahara | H04L 27/223 | 398/203 |
| 8,059,020 B2 * | 11/2011 | Schatzberger | H03M 1/186 | 341/138 |
| 8,200,100 B2 * | 6/2012 | De Langen | H04B 10/0779 | 398/210 |
| 8,260,155 B2 * | 9/2012 | Inoue | G08C 23/04 | 398/209 |
| 9,232,902 B2 * | 1/2016 | Takahashi | A61B 5/7246 | |
| 2003/0067662 A1 * | 4/2003 | Brewer | H04L 25/062 | 398/202 |
| 2004/0240041 A1 * | 12/2004 | Tian | H01S 3/06758 | 359/337 |
| 2005/0062530 A1 * | 3/2005 | Bardsley | H03K 5/082 | 330/136 |
| 2005/0244167 A1 * | 11/2005 | Liew | G11B 5/59605 | 398/202 |
| 2006/0067712 A1 * | 3/2006 | Draper | H04B 10/695 | 398/208 |
| 2007/0098416 A1 * | 5/2007 | Nogami | H04B 10/695 | 398/208 |
| 2007/0286611 A1 * | 12/2007 | Weber | H04B 10/693 | 398/202 |
| 2008/0112711 A1 * | 5/2008 | Inoue | H03F 3/45928 | 398/202 |
| 2008/0112712 A1 * | 5/2008 | Inoue | H03F 3/45636 | 398/208 |
| 2008/0205907 A1 * | 8/2008 | Kim | H03F 3/08 | 398/209 |
| 2012/0213531 A1 * | 8/2012 | Nazarathy | H03M 3/434 | 398/202 |
| 2020/0162169 A1 * | 5/2020 | Papanikolaou | H04L 25/03885 | |

* cited by examiner

| Low to High | High to low | GUI State | Definition of GUI state (bold is register changing) only one register changer at a time. |
|---|---|---|---|
| No transitions | | 0 | TIA0, DAC0, VGA0, BIAS0, BG0 |
| 587 | 547 | 1 | TIA1, DAC0, VGA0, BIAS0, BG0 |
| 622 | 582 | 2 | TIA1, DAC1, VGA0, BIAS0, BG0 |
| 657 | 617 | 3 | TIA2, DAC1, VGA0, BIAS0, BG0 |
| 692 | 652 | 4 | TIA2, DAC2, VGA0, BIAS0, BG0 |
| 727 | 687 | 5 | TIA2, DAC2, VGA1, BIAS0, BG0 |
| 762 | 722 | 6 | TIA2, DAC2, VGA1, BIAS1, BG0 |
| 797 | 757 | 7 | TIA2, DAC2, VGA1, BIAS1, BG1 |
| 832 | 792 | 8 | TIA3, DAC2, VGA1, BIAS1, BG1 |
| 867 | 827 | 9 | TIA3, DAC3, VGA1, BIAS1, BG1 |
| 1042 | 1002 | 10 | TIA3, DAC3, VGA1, BIAS1, BG1 |
| 1077 | 1037 | 11 | TIA4, DAC4, VGA1, BIAS1, BG1 |
| 1112 | 1072 | 12 | TIA4, DAC4, VGA2, BIAS1, BG1 |
| 1147 | 1107 | 13 | TIA4, DAC4, VGA2, BIAS2, BG1 |
| 1182 | 1142 | 14 | TIA4, DAC4, VGA2, BIAS2, BG2 |
| 1217 | 1177 | 15 | TIA5, DAC4, VGA2, BIAS2, BG2 |
| 1252 | 1212 | 16 | TIA5, DAC5, VGA2, BIAS2, BG2 |
| 1287 | 1247 | 17 | TIA6, DAC5, VGA2, BIAS2, BG2 |
| 1322 | 1282 | 18 | TIA6, DAC6, VGA2, BIAS2, BG2 |
| 1357 | 1317 | 19 | TIA6, DAC6, VGA3, BIAS2, BG2 |
| 1392 | 1352 | 20 | TIA6, DAC6, VGA3, BIAS2, BG3 |
| 1427 | 1387 | 21 | TIA7, DAC6, VGA3, BIAS2, BG3 |
| 1462 | 1422 | 22 | TIA7, DAC6, VGA3, BIAS2, BG4 |

OPTIC SIGNAL RECEIVER WITH DYNAMIC CONTROL

1. FIELD OF THE INVENTION

This innovation relates to optic signal receivers, and in particular to a transimpedance amplifier and other receiver elements that are dynamically adjusted based on the power level of the received signal.

2. RELATED ART

Data communication over an optical fiber using light energy or optic signal is a widely used method for short and long-haul data communication. Using optical communication systems, data rates in excess of 100 Gbits/second are achieved. One key to enable optic communication systems is the ability to accurately process the received optic signal into an electrical signal at a signal magnitude suitable for decoding. An important part of this process, prior to decoding, is converting the optic signal to an electrical signal and accurately amplifying the electrical signal.

One challenge presented when accurately processing the optical signal and amplifying the corresponding electrical signal is that in different applications and environments, the received optic signal arrives at the receiver at different power levels. The received optic signal and the resulting electrical signal as presented to the receive transimpedance amplifier (TIA) at the receiver, may vary from one installation to another for many reasons.

One reason that the power level of the received optic signal varies from one installation to another is that at the transmitter, the output power of the signal generator, typically a laser, will vary over process, temperature, from one part to the next, and over time due to aging. These factors all change the output power level for a given input. In addition, the light energy transferred in to the fiber optic cable (called coupling in the industry) can vary from system to system, and different fibers or lengths of fibers, may have different attenuation levels.

At the receiver, the power level can vary from one system to the next due to variance in coupling of light energy from the fiber optic cable to the photodetector. Moreover, from part to part and over time, photodetectors will have different efficiency and thus different output power levels. All these factors result in different power levels being provided to the TIA.

The varying power level provided to the TIA presents challenges for circuit designers seeking to minimize the bit error rate. When higher magnitude signals are presented to the TIA, less TIA gain is needed while low magnitude signals provided to the TIA requires increased TIA gain. If a large signal is provided to the TIA, and the TIA gain is too high, the large magnitude signal presented to subsequent circuit elements will overloaded or saturate these elements. Similarly, if a low power signal is presented to the TIA and the TIA gain is to low, then the output signal will not be at a power level for downstream processing.

In the prior art, the gain is controlled by an automatic gain control loop that is built into the integrated circuit and the circuit parameters are hardwired. For example, if the regulator is selected to have a voltage of 2.5V, it will be 2.5V for all power levels. While this may work well for some input power levels, it is not ideal across the entire range of possible input power levels. For example, if the designer needed to have a TIA that operated from power level of −10 dBm to +4 dBm, the designer would not be able to optimize the circuit parameters for operation at both −10 dBm and for +4 dBm. Hence, there would be a compromise in performance at both extremes.

As a result, there is a need for a TIA and associated system that optimizes TIA and other system parameters based on the input signal power level. The innovation disclosed below overcomes the drawbacks of the prior art and provides additional benefits.

SUMMARY

To overcome the drawbacks of the prior art and provide additional benefits, a method for controlling optical receiver operation in response to a received optic signal power level is disclosed. In one embodiment, this method includes providing an optic signal receiver having operation determined by one or more system settings. Then, establishing system settings for the optical receiver that govern operation of one or more aspect of the receiver, and receiving an optic signal. Next, converting the optic signal to an electrical signal and evaluating the electrical signal to determine a power level of the electrical signal such that the power level of the electrical signal corresponds to the received optic signal power level. Responsive to the power level of the received electrical signal exceeding a first predetermined threshold, adjusting a first system setting and responsive to the power level of the received electrical signal decreasing below a second predetermined threshold, adjusting the first system setting. In one embodiment, this may comprise restoring the first system setting. This method also includes, responsive to the power level of the received electrical signal exceeding a third predetermined threshold, adjusting a second system setting. Similarly, responsive to the power level of the received electrical signal decreasing below a fourth predetermined threshold, the system adjusts the second system setting.

The step of adjusting the first system setting responsive to the power level of the electrical signal exceeding a first predetermined threshold improves operation of the optical receiver. In one embodiment, system settings include settings that affect one or more of the following elements of the optic signal receiver: transimpedance amplifier, digital to analog converter, variable gain amplifier and voltage regulator. It is also contemplated that the system settings may include settings that affect one or more of the following: gain and equalization fine tuning of VGA stages, regulator voltage on the VGA, offset control for the bias loop, voltage applied to the cathode of the Photo-Diode through the integrated regulator, and the reference current.

In one embodiment, evaluating the electrical signal to determine a power level of the electrical signal comprises evaluating an automatic gain control value to determine power level. In one configuration there are 15 or more power level states, such that each power level state has one or more system settings associated therewith. For different power level states, at least one system setting changes. This method may further comprise retrieving a first value from memory to adjust the first system setting and retrieving a second value from memory to adjust the second system setting.

Also disclosed herein is an optic receiver with system settings that are set based on or are responsive to input power of a received signal. This embodiment includes a photodetector configured to receive an optic signal and convert the optic signal to an electrical signal, and an analog front-end system configured to receive, process, and amplify the electrical signal to create an amplified electrical signal. The amplification is based on one or more gain control values. A gain control unit is configured to generate one or more system control values such that the amount of amplification is determined by the one or more system control value.

In one embodiment, the analog front end comprises a transimpedance amplifier and one or more variable gain amplifiers, and the system further comprises a processor configured to evaluate the amplified electrical signal in relation to one or more threshold values and, responsive to the evaluation, adjust one or more system settings. In one configuration, the generation of the one or more gain control value comprises comparing a peak signal value over time, of the amplified electrical signal, to one or more threshold values to determine if the peak signal value over time is greater than or less than one or more thresholds. In one embodiment, the system settings are one or more of the following: equalization values for one or more variable gain amplifier stages, a regulator voltage of a variable gain amplifier, an offset control for a bias loop, and an analog front-end reference current.

It is also contemplated that the optic receiver further comprises a memory and the memory stores the one or more system settings and the one or more threshold values, such that the memory is accessible by the processor. The processor may be separate from the optic receiver.

Also disclosed is an optic module control system. The optic module has a photodetector configured to receive an optic signal and convert the optic signal to an electrical signal. In one embodiment, the control system comprises a detector configured to generate a value representing a magnitude value of the electrical signal. The control system also includes a memory storing optic module setting values, which are associated with a range of magnitude values. The controller is configured to process the magnitude value and map the magnitude values to a corresponding optic module setting value that is stored in memory. The controller is also configured to provide the corresponding optic module setting value to the optic module such that as the magnitude value of the electrical signal changes, the optic module setting values provided to the optic module also change.

It is contemplated that the detector may comprise an automatic gain control unit. The automatic gain control unit may include a peak detector to output a peak or swing of the signal. The magnitude of the electrical signal may be referred to as the output swing of the electrical signal. The optic module setting values may be stored in a loop up table which is accessed. In one embodiment, the magnitude is mapped into a range of threshold values, such that the range of threshold value are associated with a one or more optic module setting values. In one embodiment, the optic module includes a transimpedance amplifier and the optic module setting value comprises a transimpedance amplifier supply voltage. It is contemplated that the optic module system settings may be one or more of the following: gain and/or equalization level of the variable gain amplifier stages, a regulator voltage of a variable gain amplifier, an offset control for a bias loop, and an analog front-end reference current. In one embodiment, the optic module has system settings that affect one or more of the following elements: transimpedance amplifier, digital to analog converter, variable gain amplifier and voltage regulator.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
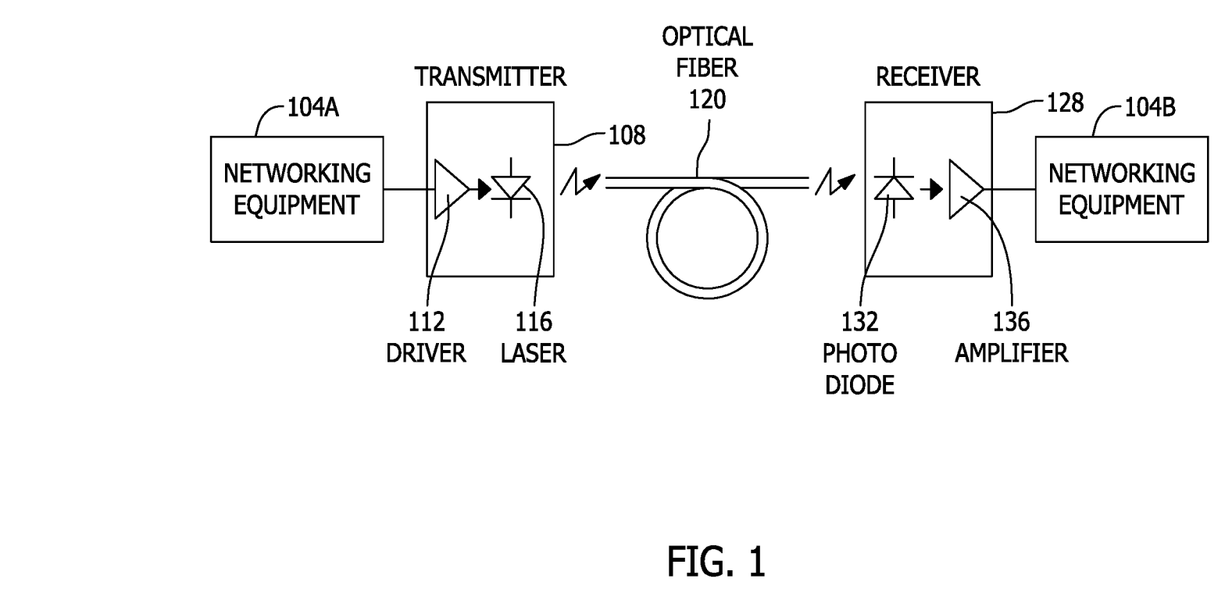
FIG. 1 illustrates an exemplary optic fiber communication link.

One example environment of use is in an optical communication system that utilizes optical fiber links and lasers or some other form of optic signal generator (light source). FIG. 1 illustrates an exemplary optic fiber communication link. To enable communication between remote networking equipment 104A, 104B a fiber optic transmitter 108 and receiver 128 are provided. Laser drivers 112, which are part of a transmitter 108, drive the lasers 116 with a bias current and modulating current which in turn produces a modulated optic output signal from the laser. This optical output is coupled into the optical fiber 120 for signal transmission. At the receiving side of the optical fiber link is a receiver 128. The receiver 128 includes a photodiode (photodetector) 132 and one or more amplifiers (only one amplifier is shown to simplify FIG. 1). The amplifier 112 may be a TIA or any other type amplifier or amplifiers. As used herein, the term amplifier means one or more amplifiers. Optical energy is converted into an electrical signal by the photodiode 132 and processed further by the one or more amplifiers 136 to set the signal magnitude to a level suitable for further processing. It is contemplated that the innovation disclosed herein may be used in other environments of use than that shown in FIG. 1.

Figure 2:
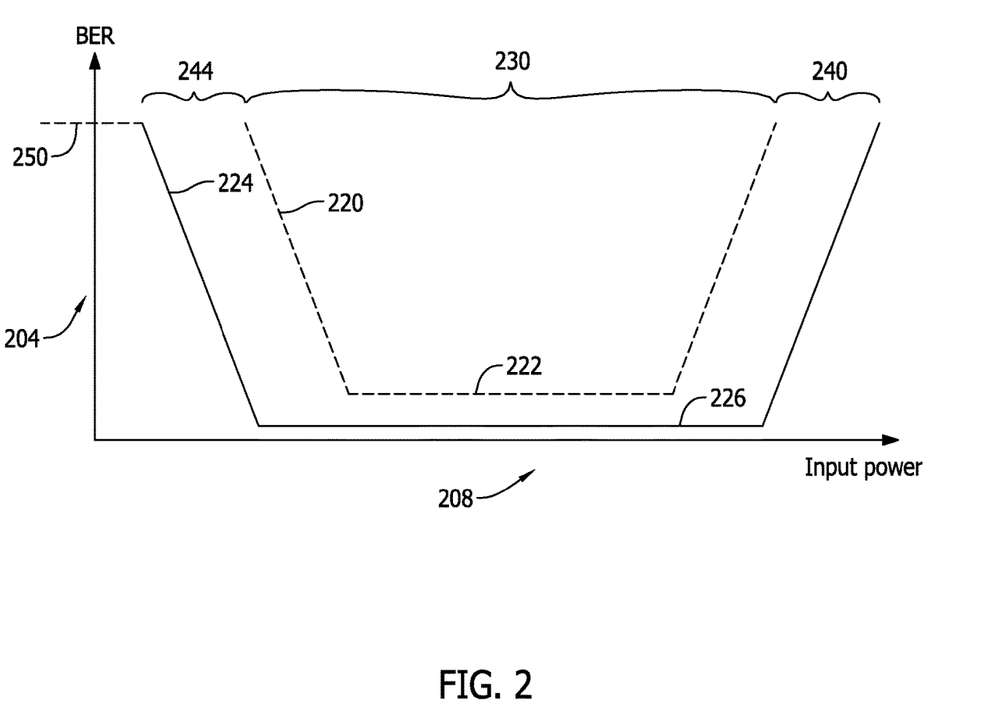
FIG. 2 illustrates a plot of bit error rate (BER) versus input power for an exemplary system.

FIG. 2 illustrates a plot of bit error rate (BER) versus input power for an exemplary system. The BER is on the vertical axis 204 while the input power is on the horizontal axis 208. In this figure two plots are shown. These plots may be referred to in the industry as bathtub curves. These plots show the BER in relation to input power. Plot 220 shows prior art system performance when the TIA settings are static, and hence there is a compromise for low and high power. Stated another way, in plot 220 the bit error rates increase for low input power and high input power. BER level 250 is the maximum acceptable BER. The prior art system had a low BER at the middle input power ranges 230. However, at upper input power range 240 and lower input power range 244 the BER rapidly increases to unacceptable levels. As discussed above, in the prior art the TIA is configured with fixed settings which are a compromise that work well in a medium input power level range 230 but suffer from a high BER at both high and low input power levels 240, 244. Even in the range of input power 230 that the prior art device did yield an acceptable bit err or rate, the bit error rate was at a level defined by the horizontal portion 222 or higher.

Stated another way, in the prior art tradeoffs are made in the design and set up of the TIA. These tradeoffs often sacrifice performance in the upper or lower input power ranges 240, 244. For example, if the regulator is selected to have a voltage of 2.5V, it will be 2.5V for all power levels, although it may be beneficial to have 2.7V for low input power, and 2.23 for high input power. The use of digital control, and knowledge of the incoming power level (from the automatic gain control unit (AGC)) and/or integrated RSSI (Receive Signal Strength Indicator) enables the disclosed system to tune the circuit parameters (there are many parameters that can be tuned), which may be referred to as system settings, to optimize operation the specific power level of the signal that the receiver or TIA is receiving over that specific optic link at a particular time.

Signal plot 224 is from a system adopting the innovation discussed below which dynamically adjusts the TIA settings and the settings of other receiver systems. As can be seen in FIG. 2, plot 224 has improved BER over wider range of input power values, thereby increasing performance at the lower input power range 244 and the upper input power range 240. The horizontal portion 226 of plot 224 has a lower BER than the horizontal portion 222 of plot 220. Thus, even for the power level ranges where the BER is in the acceptable range, the system disclosed herein has a better (lower) BER. Thus, this concept can also be used to improve the BER floor at mid-power levels. For example, without the concept disclosed herein, the BER floor might be 1E−7, but with the concept the BER floor might be 1E−9. These values are exemplary only and provided for purposes of discussion and not limitation.

Figure 3:
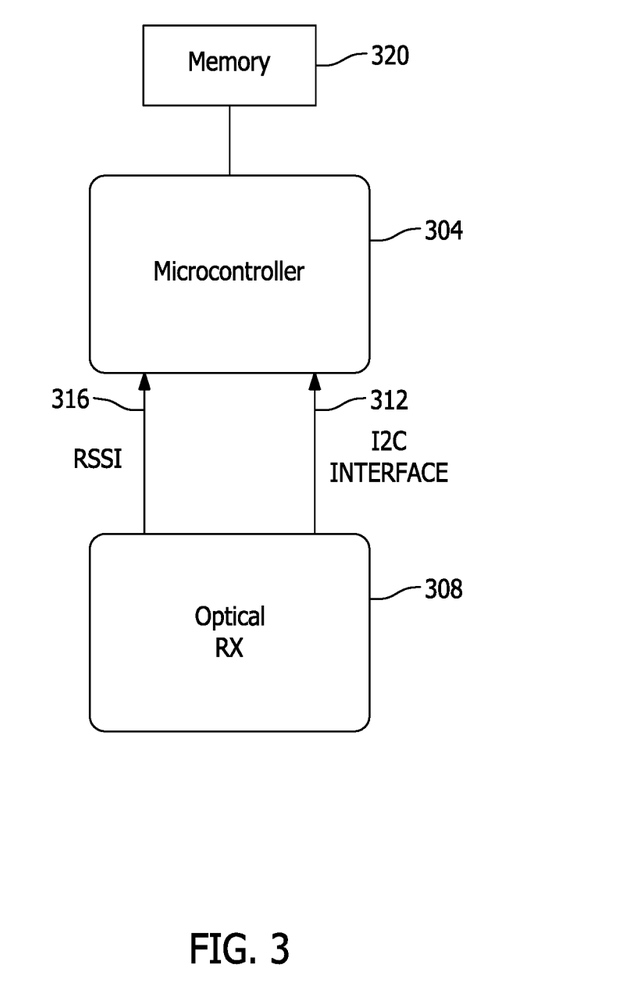
FIG. 3 illustrates an optical receiver module coupled to a microcontroller.

FIG. 3 illustrates an optical receiver module coupled to a microcontroller. This is but one example configuration and it is contemplated that other embodiments are possible such as, but not limited to, all elements on a single chip, die, or package. The optical receiver module 308 is configured to receive and process the optic signal for downstream processing, such as by a digital signal processor (not shown) or other processing element. The processing may include amplification. The optical receiver module 308 is in communication with a microcontroller 304. The microcontroller 304 receives input from the optical receiver module 308, such as information related to the power level of the received signal, and based on this input, calculates optimal settings for the optical receiver module 308. The microcontroller 304 may include or communicate with a memory 320. The interface over which the optical receiver module 308 and microcontroller 304 communicate may be an I2C interface 312, SPI, an RSSI exchange or any other analog or digital interface or channel. In other embodiments, other types of interfaces are contemplated, whether existing today or in the future. In addition, the RSSI interface uses an analog signal but it is contemplated that the signal could be digitized inside element 308 and sent across the I2C interface.

In one embodiment, the microcontroller 304 receives information from the optical receiver module 308 regarding parameters of the received signal or the optical receiver module 308. The microcontroller 304 processes this information to develop optimal parameters for the optical receiver module 308. In one embodiment, the microcontroller 304 and/or memory 320 include a look up table that stores data as discussed below in detail.

Figure 4:
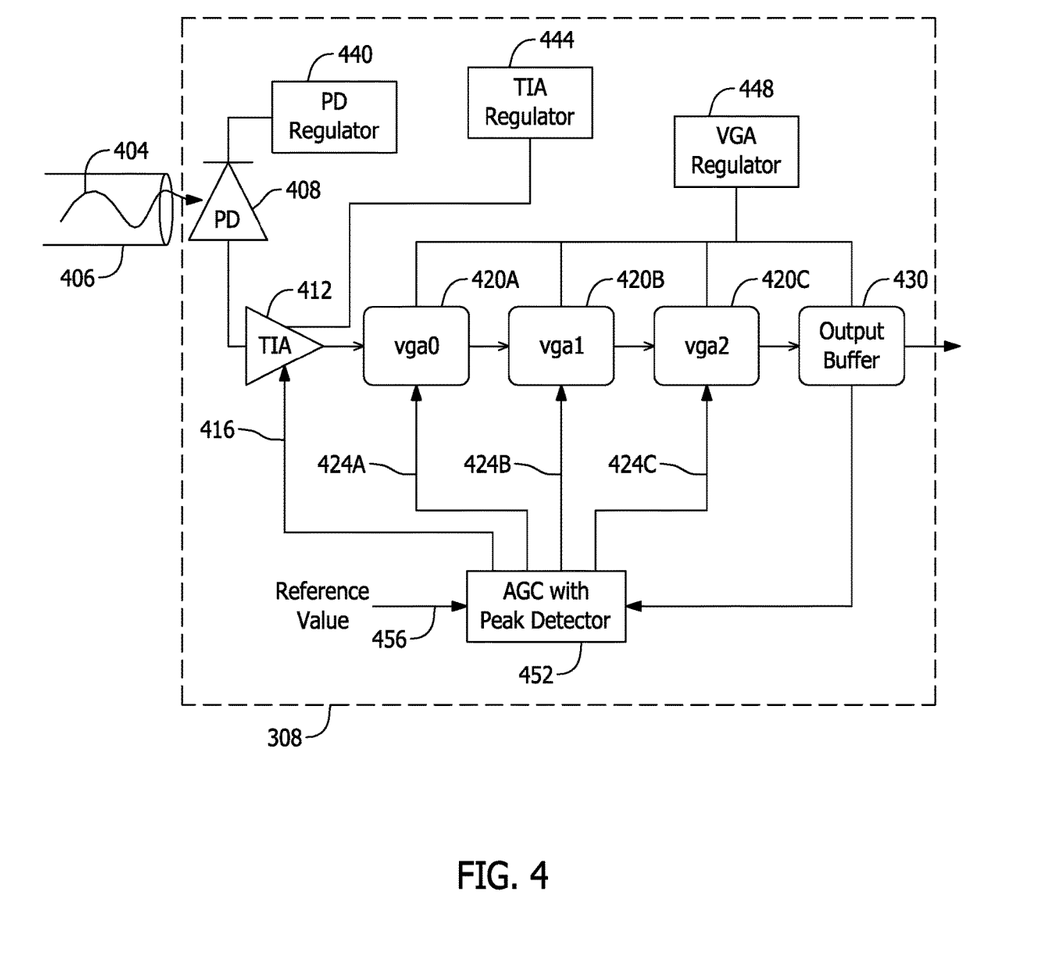
FIG. 4 illustrates an exemplary front end of an optical receiver.

FIG. 4 illustrates an exemplary analog front end of an optical receiver. This is one example configuration showing a simplified representation. In this embodiment, an optical signal 404 is presented from an optic fiber 406 to a photodiode 408. The photodiode 408, also referred to as a photodetector converts the optic signal to an electrical current. The output current of the photodiode 408 is presented as an input to a transimpedance amplifier (TIA) 412. The TIA 412 converts the current output of the photodiode 408 to a voltage and performs low noise amplification of the signal to create an amplified voltage. The TIA 412 also receives a control input 416, which may comprise one or more control settings. The control input 416 establishes the control settings of the TIA. The control settings 416 are provided from integrated digital control loops which are executed in the optical receiver or the microcontroller, or a combination of both. These settings include gain, bandwidth, noise and linearity. Through use of the control input 416, the settings of the TIA 412 are adjusted, which in turn controls TIA operation.

The output voltage of the TIA 412 is provided to a variable gain amplifier (VGA) 420A. The variable gain amplifier 420A has a control input 424A which receives control settings. Additional VGA stages 420B, 420C are downstream as shown. Each VGA stage 420B, 420C includes a control input 424B, 424C which provides control settings as discussed above. These control settings control the gain of the VGAs 420 as well as gain, bandwidth, noise and linearity. It is contemplated that each control setting is independent in value and adjustability of the other control settings thereby providing great flexibility of operation. Although shown with three VGAs 420 it is contemplated that a greater or fewer number of VGA elements may be used. The VGAs 420 function is to amplify the input electrical signal presented to it.

The output of VGA 420C connects to an output buffer 430. The output buffer 430 is configured to drive downstream elements. It is contemplated that the TIA 412 may be integrated with a DSP (digital signal processor) and in such an embodiment the output buffer 430 would not be needed.

Also shown in FIG. 4 is an AGC unit 452 with a peak detector that receives signal information from the output buffer 430 or the output signal from the output buffer. The AGC 452 processes the signal from the output buffer 430 to derive the peak value or an average peak value, such as based on a peak envelope signal. The AGC unit 452 also receives a reference value 456 and compares the peak value to the reference value to determine if the output is above, at, or below the desired magnitude, based on the peak value or some other factor. Responsive to the comparison, the AGC provides control signals on path 416, 424A, 424B, 424C to the TIA and VGA units to control the gain. The path through AGC 452 may be referred to a digital control loop. For example, if the electrical signal is at a low value, then the TIA regulator voltage should be at a high voltage, but if the electrical signal is at a high value, then the TIA regulator voltage should be at a low voltage. This allows for changing the state of TIA regulation as a function of received signal power level with the microcontroller.

Also shown in FIG. 4 is a photodiode regulator 440 connected to the cathode of the photodiode 408. The photodiode regulator 440 is configured to bias the photodiode 408 by providing a bias signal to the cathode. Connected to the TIA 412 is a TIA regulator 444. The TIA regulator 444 controls the supply voltage provided to the TIA circuit. As shown, a VGA regulator 448 connects to each VGA 420 and is configured to control the supply voltage for the VGA circuits. Although shown as a single element, the VGA regulator 448 could be split into several devices. The regulators 444, 448 control the supply voltage to the various elements. Notably the TIA and VGA settings may be controlled to adjust one or more of the following:

1. Power ($1^{st}$ order impact)
2. Bandwidth ($2^{nd}$ order impact)
3. Gain ($2^{nd}$ order impact)
4. Linearity
5. Noise Generally speaking, the performance of the ROSA (PD+TIA+VGA) is limited by gain, bandwidth, noise and linearity. The system makes adjustments to these elements to fine tune them for the power level that is coming in. In one embodiment, the microcontroller 304 (FIG. 3) controls the settings of one or more of the PD regulator 440, TIA regulator 444, VGA regulator 448.

In operation, the control settings provided to the TIA and the VGAs 420 that are provided over the control inputs 416, 424 adjust and control operation of the TIA and the VGA. By adjusting the control settings, the gain, bandwidth, noise, linearity, power consumption and output swing are dynamically controllable which in turn modifies system performance in relation to input signal power. This provides a benefit over prior art systems in which the TIA, VGA and PD settings are fixed at a compromise level which optimizes operation for middle input power levels but has poor operation at high and lower input signal power levels. Thus, the system has performance tradeoffs resulting in the degraded performance at upper and lower input power levels. In one embodiment, the control settings are received from a microcontroller, such as microcontroller 304 of FIG. 3, when the TIA 412 and VGAs 420 are part of the optical receiver 308. The control settings are discussed in greater detail below. In one embodiment the TIA, VGA and output buffer are integrated into the chip today, as are the regulators. The PD and DSP may not be integrated in the same chip. However, in other embodiments other arrangements of elements are possible. The control setting may be generated by any element in the receiver, such as a controller, processor, DSP, ASIC, control logic, look-up table, or any other element.

Figure 5:
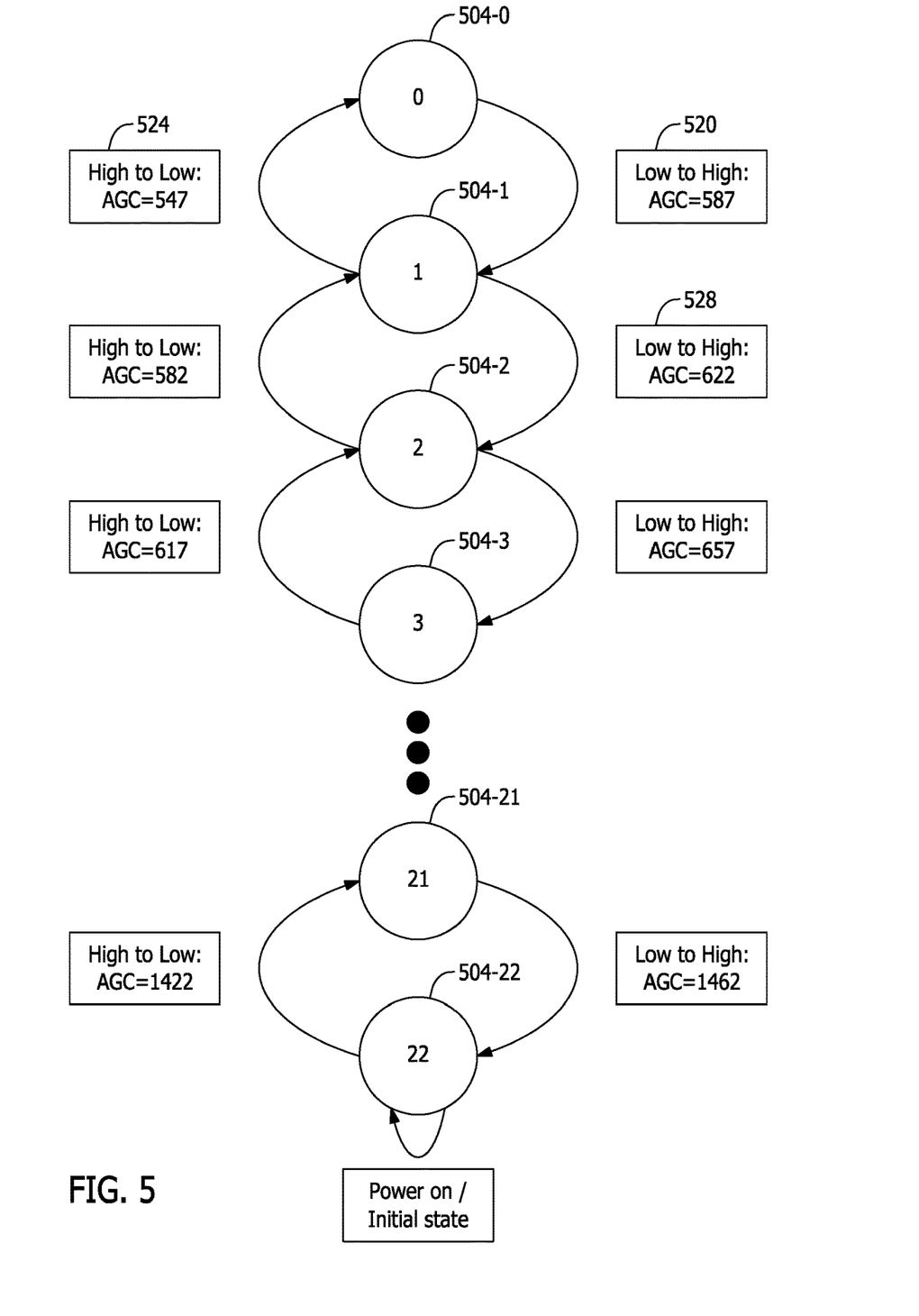
FIG. 5 illustrates a state diagram of exemplary states that are defined by an AGC (automatic gain control) value.
Figure 6:
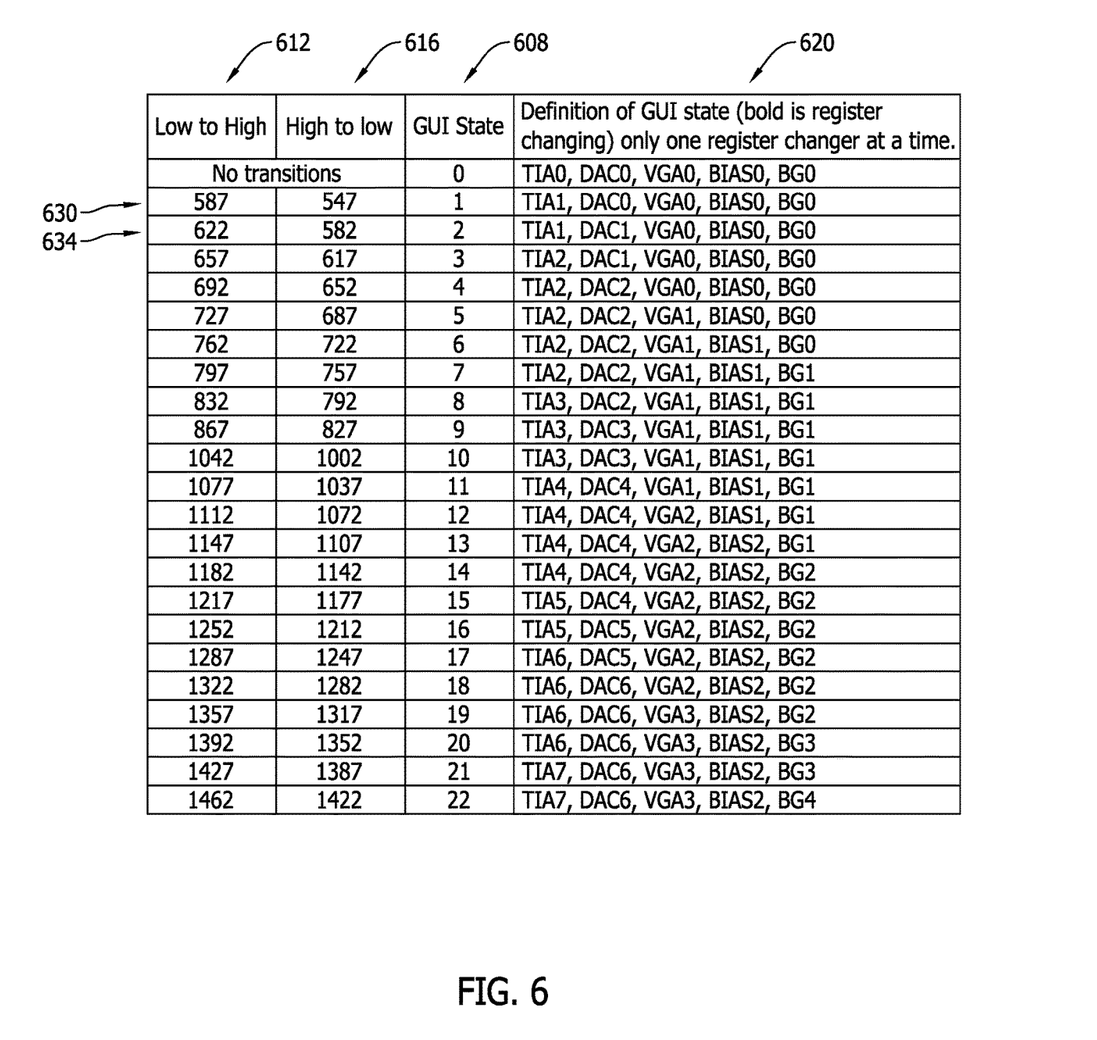
FIG. 6 illustrates an exemplary table of the states of the state diagram correlated with AGC value and the resulting system settings.

FIG. 5 illustrates a state diagram of exemplary states that are defined by an AGC (automatic gain control) value. FIG. 6 illustrates an exemplary table of the states of the state diagram correlated with AGC value and the resulting systems settings. In FIG. 6, the values in column 612 may be referred to as a low to high threshold value, while column 616 contains the high to low threshold, in effect creating a hysteresis effect which has value for those versed in the art. FIGS. 5 and 6 are discussed below with reference being made to both. The numeric values shown in FIGS. 5 and 6 are for discussion only and it is contemplated that any values may be substituted for the disclosed values to suit different operational environments.

In reference to FIG. 5, in this exemplary embodiment there are 23 states 504, referred to as state 0 504-0 through state 22 504-22. Each state 504 defines different system settings that optimize system operation for different input power levels. In this embodiment, the input power level controls what state (states 0-22) the system is in at a particular time. The state (0-22) in which the system is in defines or controls the system setting values. In other embodiments, a different number of states may be enabled.

In the automatic gain control (AGC) circuitry, there is typically a peak detector whose function is to detect the output swing of the output buffer. A received signal will vary between a maximum and minimum value. The difference between the maximum value and the minimum value is defined as the swing. If the output swing of the received signal from the output buffer 430 is larger than the target output swing, then the AGC reduces the gain by increasing the AGC state. If the output swing is smaller than the target output swing, the AGC increases the gain, by reducing the AGC state. In this embodiment, an AGC=0 results in maximum gain and an AGC=2016 has the minimum gain. Hence, the AGC value is a rough proxy or indicator for the incoming input power The target output swing is used as a reference and is defined through registers. It can be dynamically changed by a user, at the time of manufacture, or by another system or device.

In this embodiment, AGC control value is a number between 0 and 2016. If AGC=0 there is a very small input power. If AGC=2016, there is a very large input power.

The RSSI is also an indication of the input power, albeit not an ideal indicator, because the RSSI is a measure of the DC content of the incoming signal. In optical signals, a large DC signal component may be present, but it does not also indicate that there is a large AC signal. Of note, a DC signal carries no information, while an AC signal carries all the information. There is another loop, not the AGC loop, which removes or reduces any large DC currents which may be present so the sensitive signal path (TIA+VGA) does not get saturated by the DC signal.

Turning to FIG. 6, the corresponding states 504 from FIG. 5 are shown in GUI state column 608. States 0-22 are shown in the table as well as the state diagram. In FIGS. 5 and 6, the AGC value is used to determine which state the system is in at different points in time. The AGC values at which the state diagram transitions, from one state to the next, is referred to as transition points. As shown in FIG. 5, state 0 504-0 is the state defined when the AGC value is 587 or less. Thus, the state diagram is maintained at state 0 504-0 until the AGC value exceeds 587, i.e., when the AGC value exceeds the state 0 low to high transition point. When the ACC value exceeds 587, the state advances to state 1 504-1. In this embodiment, the state only advances to state 2 504-2 when the AGC values exceeds the next low to high transition point 528 and an AGC value of 662. This stepwise progression through states is repeated as the AGC value increases.

FIG. 6 provides additional details regarding the low to high transition points that cause the system to change from a lower state to an upper state. Column 612, labeled Low to High, defines the AGC values for all the states that control when the state will increment to the next highest state. Thus, column 612 contains threshold values representing the received signal magnitude (peak value, swing, AGC value, RSSI, or any other similar indicator or combination of such signals) such that as the received signal magnitude is moving from a lower to higher values, and passes one of these threshold values, the system settings from column 620 are provided to the receiver. For example, to advance from state 10 to state 11, the AGC value must exceed 1077. When the AGC value exceeds 1077, the system settings listed in column 620 are provided to and used by the optic receiver, which in turn controls how the optic receiver processes the received signal. Each of the variables or registers in column 620 represent a numeric value that is stored in memory or calculated. Similarly, the state diagram advances from state 1 to state 2, as shown in rows 630, 634, when the AGC value increases beyond 622, which in turn causes the following values (defined by variables) to be used by the receiver: TIA1, DAC1, VGA0, BIAS0, and BG0. In various embodiments, the values of these variables or the data stored at these register locations will vary.

To change the state value in the opposite direction (downward), a generally opposite process occurs but with a different set of transition points or threshold values, referred to herein as high to low transition points. These are shown in column 616 and are the transition thresholds when the AGC value is decreasing from a higher value to a lower value. For example, to drop from state 2 504-2 to state 1 504-1, the high to low transition point 524 is defined as AGC value 582. Thus, to decrement from state 2 504-2 to state 1 504-1 the AGC values must drop below 582. When this occurs, the values defined in column 620 are then used by the optic receiver. Similarly, to decrement from state 1 504-1 to state 0 504-0 the AGC value must drop below 547. In FIG. 6, column 616 is labeled "High to Low" defining the high to low transition points when decreasing value for each state.

When comparing the values in column 612 and 616, it can be seen that for a given state, the low to high transition points are different than the high to low transition points. This establishes a hysteresis into the system to prevent the system from rapidly oscillating between states due to minor changes in the AGC value. It is contemplated that the system may power on or have a default setting corresponding to any state, such as state 11, which defines a mid-state, or state 0 or state 22, or any other state.

In reference to FIG. 6, which is also shown in column 620 and is titled Definition of GUI state, are the system setting variables that define the system settings for each state. The system variables in column 620 are variables which represent a system setting in the form of a numeric value that are stored in memory. These settings (values) are used by the system to adapt operation based on the AGC values, i.e. power of the input signal as determined by the AGC value or some other determination of input signal power level. In this embodiment, a change in state 608 changes only one of the system settings but in other embodiment other adjustment schemes are contemplated. For example, transitioning from state 3 to state 4 results in a change in DAC value from DAC1 to DAC2, where DAC1 and DAC2 represent different numeric settings for the digital to analog converter. The values from the DAC variable may be stored in memory and provided to the optic receiver such that a different DAC value (DAC1 value to DAC2 value) is provided to the optic receiver when the state changes from state 3 to state 4.

In this example embodiment, the adjustable system settings and a short description of the variable's function in accordance with this innovation, are as follow:

TIA # defined as the regulator voltage on the TIA
DAC # defined as the gain and equalization fine tuning of VGA stages
VGA # defined as the regulator voltage on the VGA
BIAS # defined as an offset control for bias loop
BG # defined as a chip reference current All these elements have an impact on gain, bandwidth, noise and linearity of the device. These variables are shown in column 620 of FIG. 6. The system is quite complex, and there is an interaction between all the elements such that these variables are not perfectly orthogonal to each other. As shown in FIG. 6, during some state changes, only one or two variable change. This allows for slow or minor changes to the optic receiver settings in response to small changes in the AGC value that only changes one state. The values for these variables are stored in memory, such as a look up table, or based on calculations in real time.

By adjusting these values in response to input power as defined by the AGC value, the state is correspondingly incremented and decremented, which in turn changes the variable values shown in column 620, which are used by the optic receiver. Thus, the system operation is dynamically tailored and adjusted to be ideal for the detected input signal magnitude (power level) as defined by the AGC value or some other parameter based on power of the received signal. In this embodiment, there are eight possible TIA values, namely TIA0 through TIA7. In other embodiments, a greater or less number of TIA values may be used. Similarly, VGA settings can be established at any of 4 different values defined by VGA0 through VGA3. In other embodiments, a greater or lesser number of VGA settings values may be used. This is true for all the variables listed in column 620 of FIG. 6.

In reference to row 630 of FIG. 6, state 1 establishes the following system values: TIA1, DAC0, VGA0, BIAS0 and BG0. However, at state 2 the DAC value has changed from DAC0 to DAC1 while all the other system settings remain the same. Advancing to state 22, many of the system settings have been changed, namely the variables values are now: TIA7, DAC6, VGA3, BIAS2 and BG4. In this way, small but effective changes at each change in state can be made to accommodate different input power levels thereby tailoring operation, based on system settings and based on the power level of the received signal. This allows the system to operate at a low BER over a wider range of input powers than the prior art as shown by plot 224 in FIG. 2.

Figure 7:
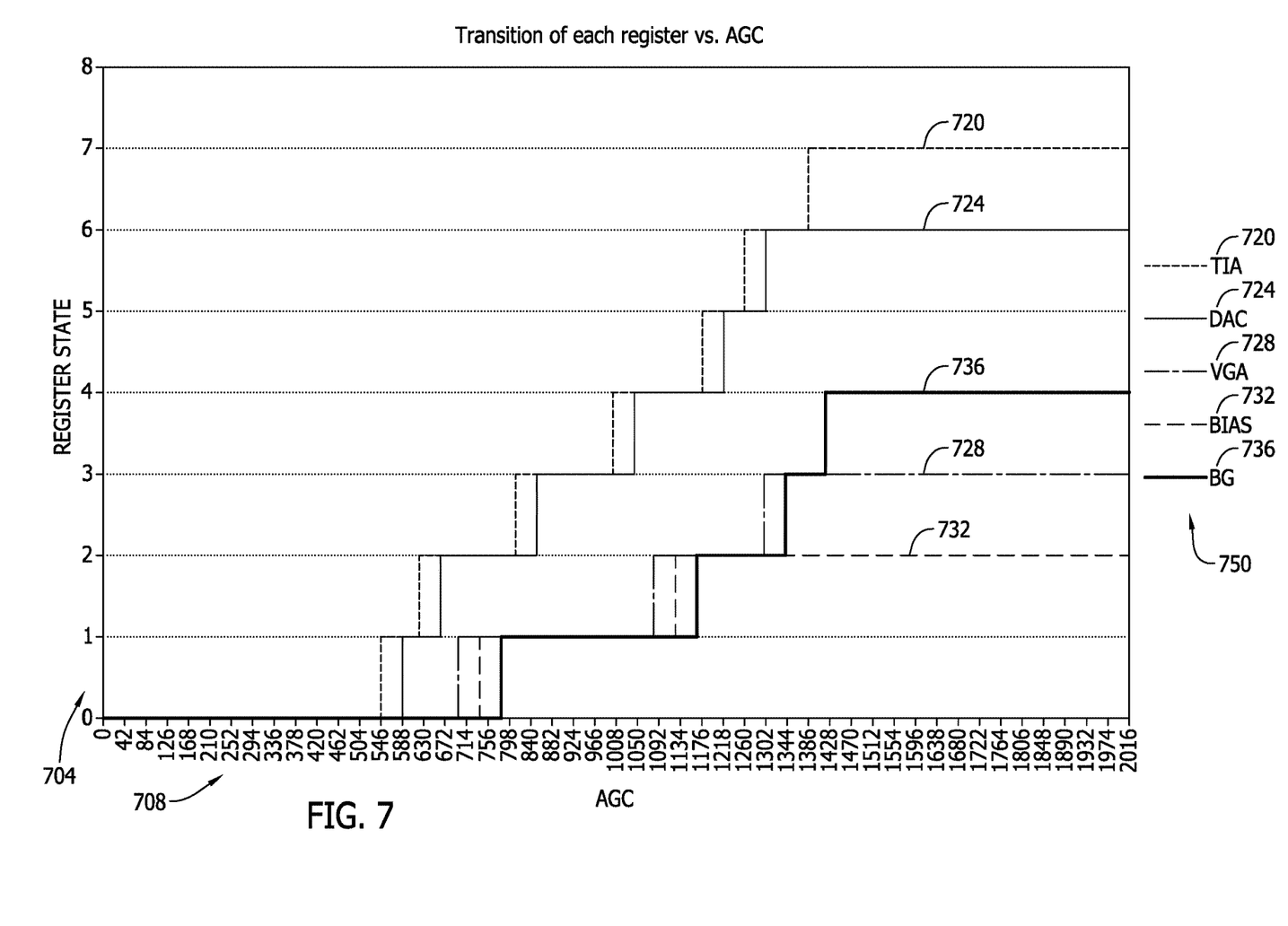
FIG. 7 illustrates a graphical representation of the stair step change of the system values (TIA #, DAC #, VGA #, BIAS #, BG #).

FIG. 7 illustrates a graphical representation of the state step change of the system value variables (TIA #, DAC #, VGA #, BIAS #, BC #). The vertical axis 704 represents the register state while the horizontal axis 708 represents the AGC values, which may be considered an indication of power of the received signal (input power). In this configuration, the variables may be set at up to 8 (0-7) different values. As can be seen, the TIA values 720 may assume 8 different values, but the bias value 732 only ranges through 3 different values. In this plot, the states of the various system values are plotted in relation to the AGC values on the horizontal axis. The different states cause different values for the system setting to be retrieved from memory and utilized for system operation. The values for these system settings may be stored in memory. For example, the system may store eight different TIA variable values. The TIA variable controls the supply voltage on the TIA circuit element. The TIA circuit element is the most sensitive and most influential variable value, that has a significant effect on the entire chain, hence fine-tuning the voltage for a given input power has importance.

In this example embodiment there are five system settings: TIA 720, DAC 724, VGA 728, BIAS 732, BG 736 as shown on the righthand side of the plot in the key 750. Each of these variables are represented on the plot with a different type of line. As can be seen in the figure when the AGC value increase, the TIA value changes to the value stored for state 1 or TIA register 1 (memory location). Then as the AGC value increases further, the DAC value changes from DAC0 to DAC1. The DAC0 value may be stored in DAC0 register while the DAC1 value may be stored in DAC1 register, which are two different memory locations or addresses. Next, as the AGC value further increases the system eventually transitions from state 4 to state 5 (see FIG. 6) causing the VGA variable to change from VGA0 to VGA1.

In this manner, as the AGC values increase, the various system setting values also change (increase or decrease) to cause the system to operate in a manner that is optimized for the change (increase or decrease) in the power of the input signal. The exemplary values and transition points for each system setting, as shown in FIG. 7, are only for an example embodiment. Different transition points (AGC values) are contemplated, and in other embodiments different system settings may change at different transition points or in a different order.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for controlling optical receiver operation in response to received optic signal power level comprising:
   providing an optic signal receiver having operation determined by one or more system settings;
   establishing system settings for the optical receiver;
   receiving an optic signal;
   converting the optic signal to an electrical signal;
   evaluating the electrical signal to determine a power level of the electrical signal, such that the power level of the electrical signal corresponds to an average peak level of the received optic signal;
   responsive to the power level of the electrical signal exceeding a first predetermined threshold, adjusting a first system setting;
   responsive to the power level of the electrical signal decreasing below a second predetermined threshold, adjusting the first system setting;
   responsive to the power level of the electrical signal exceeding a third predetermined threshold, adjusting a second system setting;
   responsive to the power level of the electrical signal decreasing below a fourth predetermined threshold, adjusting the second system setting.

2. The method of claim 1 wherein adjusting the first system setting responsive to the power level of the electrical signal exceeding the first predetermined threshold improves operation of the optical receiver when the power level of the electrical signal exceeds the first predetermined threshold.

3. The method of claim 1 wherein the system settings include settings that affect one or more of the following elements: transimpedance amplifier, digital to analog converter, variable gain amplifier and voltage regulator.

4. The method of claim 1 wherein the system settings include settings that affect one or more of the following: gain and equalization fine tuning of VGA stages, regulator voltage on the VGA, offset control for bias loop, and reference current.

5. The method of claim 1 wherein evaluating the electrical signal to determine a power level of the electrical signal comprises evaluating an automatic gain control value to determine power level.

6. The method of claim 1 wherein there are 15 or more power levels, such that each power level has one or more system settings associated therewith.

7. The method of claim 1 wherein the first system setting and the second system setting are stored in a memory, and the method further comprises retrieving the first system setting and the second system setting from memory based on the power level of the electrical signal.

8. An optic receiver with system settings responsive to input power comprising:
   a photodetector configured to receive an optic signal and convert the optic signal to an electrical signal;
   an analog front-end system configured to receive, process, and amplify the electrical signal to create an amplified electrical signal, the processing and amplification based on two or more system control values; and
   a control unit configured to generate the two or more system control values, such that the processing and amplification is determined by the two or more system control values and the processing and amplification are selected from the following: equalization values for one or more variable gain amplifier stages, a regulator voltage of a variable gain amplifier, an offset control for a bias loop, and an analog front-end reference current.

9. The optic receiver of claim 8 wherein the analog front end comprises a transimpedance amplifier and one or more variable gain amplifiers and the system further comprises a processor configured to evaluate the amplified electrical signal in relation to one or more threshold values and, responsive to the evaluation, adjust one or more system control values.

10. The optic receiver of claim 8 wherein the generation of the one or more system control values comprises comparing a peak signal value over time, of the amplified electrical signal, to one or more threshold values to determine if the peak signal value over time is greater than or less than one or more thresholds.

11. The optic receiver of claim 8 wherein the optic receiver further comprises a memory and the memory stores the one or more system control values and the one or more threshold values such that the memory is accessible by the processor.

12. The optic receiver of claim 8 wherein the processor is separate from the optic receiver.

13. An optic module control system, the optic module having a photodetector configured to receive an optic signal and convert the optic signal to an electrical signal, the control system comprising:
   a detector configured generate a value representing an average peak value over time of the electrical signal;
   a memory storing optic module setting values, which are associated with a range of magnitude values;
   a controller configured to:
      process the magnitude value and map the average peak values to one or more corresponding optic module setting values that are stored in memory;
      provide the one or more corresponding optic module setting values to the optic module such that as the average peak values of the electrical signal increases or decreases beyond or below different threshold values, the optic module setting values which are provided to the optic module also change such that:
         responsive to the average peak values of the electrical signal exceeding a first predetermined threshold, adjusting a first optic module setting value;
         responsive to the average peak values of the electrical signal decreasing below a second predetermined threshold, adjusting the first optic module setting value;
         responsive to the average peak values of the electrical signal exceeding a third predetermined threshold, adjusting a second optic module setting value;
         responsive to the average peak values of the electrical signal decreasing below a fourth predetermined threshold, adjusting the second optic module setting value.

14. The system of claim 13 wherein the detector comprises an automatic control unit.

15. The system of claim 14 wherein the detector is part of an AGC unit and the AGC unit compares the average peak value to a threshold and, responsive to the comparison, adjusts the gain applied to the electrical signal.

16. The system of claim 13 wherein the optic module setting values are stored in a look-up table that is contained in the memory.

17. The system of claim 13 wherein the optic module includes a transimpedance amplifier and the optic module setting values comprises a transimpedance amplifier supply voltage.

18. The system of claim 13 wherein the optic modules settings values are one or more of the following: equalization of a variable gain amplifier stage, a regulator voltage of a variable gain amplifier, an offset control for a bias loop, and an analog front-end reference current.

19. The system of claim 13 wherein the optic module settings values affect one or more of the following elements: transimpedance amplifier, digital to analog converter, variable gain amplifier and voltage regulator.

* * * * *